(12) United States Patent
Walker et al.

(10) Patent No.: US 7,061,899 B2
(45) Date of Patent: Jun. 13, 2006

(54) METHOD AND APPARATUS FOR PROVIDING NETWORK SECURITY

(75) Inventors: Philip M Walker, Fort Collins, CO (US); Roland M Hochmuth, Ft Collins, CO (US); Robert P Martin, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 886 days.

(21) Appl. No.: 09/846,407

(22) Filed: May 1, 2001

(65) Prior Publication Data

US 2002/0163920 A1 Nov. 7, 2002

(51) Int. Cl.
*H04L 12/28* (2006.01)

(52) U.S. Cl. .................... 370/351; 370/400
(58) Field of Classification Search ........... 370/400, 370/401, 351, 389, 392; 709/249
See application file for complete search history.

(56) References Cited

U.S. PATENT DOCUMENTS

| | | | |
|---|---|---|---|
| 4,896,319 A * | 1/1990 | Lidinsky et al. ............. 370/427 |
| 6,076,168 A * | 6/2000 | Fiveash et al. ............... 726/11 |
| 6,097,727 A * | 8/2000 | Peters ......................... 370/400 |
| 6,301,662 B1 * | 10/2001 | Hardjono ..................... 713/176 |
| 6,438,612 B1 * | 8/2002 | Ylonen et al. ............... 709/249 |
| 6,795,917 B1 * | 9/2004 | Ylonen ........................ 713/160 |
| 6,963,982 B1 * | 11/2005 | Brustoloni et al. .......... 713/160 |
| 6,966,003 B1 * | 11/2005 | Joseph et al. ................ 370/216 |
| 7,003,118 B1 * | 2/2006 | Yang et al. .................. 380/287 |
| 2001/0009025 A1 * | 7/2001 | Ahonen ....................... 713/161 |
| 2001/0042201 A1 * | 11/2001 | Yamaguchi et al. ......... 713/151 |
| 2002/0062344 A1 * | 5/2002 | Ylonen et al. ............... 709/204 |
| 2002/0104020 A1 * | 8/2002 | Strahm et al. ............... 713/201 |
| 2002/0129271 A1 * | 9/2002 | Stanaway et al. ........... 713/201 |
| 2003/0033401 A1 * | 2/2003 | Poisson et al. .............. 709/224 |

* cited by examiner

*Primary Examiner*—Chau Nguyen
*Assistant Examiner*—Hong Sol Cho (57) ABSTRACT

An apparatus and a method are provided for performing network routing. The present invention comprises authentication logic, decision logic and routing logic. The authentication logic is configured to receive packets sent from a source agent to a tunnel endpoint and to determine whether or not the security association corresponds to the source agent that configured the tunnel. The decision logic makes a routing decision that is constrained based on the security association of an authenticated. The routing logic then selects a routing destination for the authenticated packet that is based at least partially on the routing decision made by the decision.

30 Claims, 3 Drawing Sheets

METHOD AND APPARATUS FOR PROVIDING NETWORK SECURITY

TECHNICAL FIELD OF THE INVENTION

The present invention relates to communications and, more particularly, to a method and apparatus for providing flexibility and efficiency in managing network security.

BACKGROUND OF THE INVENTION

In order to provide connections between networks that are secure, leased lines are often used because they generally are not publicly accessible. However, leased lines tend to be expensive, and so there is an incentive to use public networks, such as the Internet, to create secure tunnels between remote private networks. However, public networks are inherently not secure. Therefore, various techniques and protocols must be used to ensure that communications sent over a public network are secure and that private networks connected to the public networks are secure from attacks.

Security, in this context, consists primarily of the following three concerns: If data is to be securely transported over a public network, such as the Internet, it must be protected against intentional or accidental modification. In addition, if privacy is a concern, the data must be encrypted to prevent eavesdropping by unauthorized eyes. Finally, the establishment of a secure connection must provide for some kind of guarantee regarding the identity of each participant in the exchange of data. These three concerns are referred to herein as "data integrity", "confidentiality", and "source authentication" (also referred to herein as simply "authentication"), respectively. Although there are network security considerations that are not discussed herein (e.g., non-repudiation), these three, and authentication in particular, are sufficient for describing the present invention.

A "tunnel" is a term sometimes used to denote a secure channel that is configured between two endpoints to enable information to be securely exchanged between the endpoints. An example of this usage is the tunnel mode of the Internet Security Protocol (IPSec) and the associated IPSec Encapsulating Security Payload (ESP) Protocol, which may be used to create a Virtual Private Network (VPN). Another related, but more general, use of the word "tunnel" is when an "inner" protocol packet is transported as the payload of another "outer" protocol packet. This encapsulation process is typically accomplished by attaching the outer protocol "header" to the inner packet, thus creating a new, larger packet. At the other end of the tunnel, a decapsulation process restores the original, inner payload packet. In principal, there is no limit to the number of times this tunneling process can be nested, since the packets of one tunnel can be encapsulated within another tunnel. As long as each nested tunnel header is decapsulated at its corresponding tunnel endpoint, the original packet can be successfully retrieved.

Each tunnel header provides information that is typically used to identify the type of tunnel with which it is associated, to authenticate the packet, and to perform other services. It should be noted that the network endpoints of the outer tunnel packets are not necessarily the same as the network endpoints of the inner payload packets, because both tunnel packets and payload packets may carry independent network addresses in their respective headers. Therefore, when a payload packet has been decapsulated at a tunnel endpoint, it might afterwards be forwarded to, for example, an ultimate destination by the tunnel endpoint device (e.g., a security gateway, or other tunnel endpoint device.)

The establishment of a tunnel generally involves performing processes that prevent unauthorized access to a network located at an endpoint of the tunnel. A tunnel can be as simple as a channel between two endpoints in which identity authentication is performed by the mutual exchange of shared secrets or passwords between these endpoints. In this simplified case, if the passwords are correct, the participants are assumed to be legitimate and are assumed to have agreed to exchange data.

Tunnel configurations can also be highly complex so that the level of security associated with transmitting information over the channel and gaining access to the networks through their respective endpoints is very good. Currently, various protocols exist that are intended to provide secure communication over public networks, such as, for example, the Internet Protocol Security (IPSec) protocol. IPSec is generally considered to be a standard protocol for communicating securely over the public Internet. IPSec provides layers of security via security policies and cryptographic algorithms.

Tunnel services are often provided by devices that also provide other services. "Routing" is a term usually employed to refer to the process of selecting the route for a network packet to take when traversing between two network endpoints. A router is a piece of equipment that, among other things, is involved in making these routing decisions. A router may also have features for establishing and managing authenticated tunnels, and for determining which routes within the trusted network are accessible to packets entering and leaving each tunnel. Existing VPN equipment was designed with the assumption that authenticated payload data may be trusted to provide its own routing information. This is because secure tunneling has been viewed primarily as an economical method for interconnecting networks that, although remote from each other, are part of the same trust domain.

These various protocols, including the IPSec protocol, typically communicate data in the form of packets that include header information used to identify and authenticate the originator of the packet. These packets also include a "payload", which is the data to be transported, and which may include various unspecified types and formats of data. If a particular payload packet is an IP packet, it will include IP header information. However, while encapsulated within a tunnel packet, the IP header does not normally participate in network processes, other than in the context of "a passenger". The additional IP header information is added to the payload packet as a result of IPSec ESP tunnel mode encapsulation and provides tunnel management information. This additional IP header information may be viewed as the "outside" of the tunnel, whereas the payload is considered to be "inside" the tunnel. Once a tunnel has been established and configured, end-to-end transfers of data may take place through the tunnel between the endpoints. Conceptually, a tunnel could be unidirectional, although they typically allow bi-directional transfer of packets.

Encryption and decryption techniques are often employed as part of the processing of data as it enters and exits a tunnel. This provides protection against the risk of eavesdropping by untrusted agents during data transit, which can occur when tunnels are created over public networks if such additional protection steps are not taken. However, if the transport network is private and trusted, or if there is no need to keep the data private, then the primary purpose for using a tunnel may only be authentication. Because the benefits of the present invention are associated primarily with the authentication process, the present invention is applicable to any tunnel method that involves authentication, whether or not encryption/decryption or other processes are also involved, as discussed below in the Detailed Description of the Invention.

When a tunnel is created, an important initial requirement is to create a Security Association (SA) that represents a "contract" between the participants. These SAs are used thereafter during the life of the tunnel to authenticate packets as having come from the original participants. In IPSec, each SA is unidirectional, so two SAs are required (inbound and outbound) to create a bi-directional tunnel. A tunnel endpoint is able to use the information contained in the SA to verify each inbound packet arriving through the established tunnel as having come from the other contracting SA party. An SA may be created with a finite lifetime, and if an SA expires, a new one must be established if communication is to continue through the tunnel.

The process of creating an SA necessarily involves the establishment of a private shared key, known only by the two tunnel endpoints. One example of a known method for establishing a shared key is commonly referred to in the art as the Diffie-Hellman key exchange. Because key exchange processes can be computationally expensive, there is an incentive to use a single SA for the authentication of many individual payload packets. After the secure exchange of a shared key, all payload packets transported through a tunnel can be efficiently authenticated by various methods based on the shared key by, for example, using Message Authentication Codes (MACs).

Throughout the remainder of this document, "authentication", unless otherwise stated, is intended to denote the process of establishing confidence that a packet came from the same party that established the SA by which (using the shared key, and other information in the SA) the packet is to be cryptographically validated. It should be noted that, if appropriate care is taken to observe adequate security processes, then authentication may be viewed as a method of verifying the party from whom a packet came. The packet may be assumed to have come from a party to the password, private key, or other secret information that was required to create the SA. In this sense, an SA may be viewed as data that identifies the originator of the packet.

After the authentication phase, a tunnel is available for the exchange of data packets between the endpoints. A preparation process (encapsulation) is performed on packets as they enter a tunnel, and a verification process (decapsulation) occurs as the packets exit the tunnel. The preparation process adds authentication information to each payload packet, and the verification process removes the authentication information. The verification process confirms or rejects the authenticity of payload packets. This typically involves mathematical processes (e.g., hashing) designed to provide very high confidence as to the probable origin of the packet. In the best case, such processes are widely believed to provide a virtual guarantee of authenticity. If encryption or scrambling is also used to enhance privacy, an additional goal of decapsulation is to convert the packet back to the original unencrypted or unscrambled format (i.e., the form that it had before entering the tunnel). Once all necessary decapsulation processes have been completed, the authenticated packet is often classified thereafter as "trusted", and, consequently, is merged in with other trusted network traffic.

The assumption that all incoming tunnel packets are equally trusted creates dependencies that complicate the network administration process. If additional security requirements exist, such as the need to restrict tunnel traffic to a subset of resources in the remote network, these requirements must be enforced by additional methods beyond the tunnel itself. The security of these additional methods rests on the reliability and accuracy of the contents of the payload packets, because this is normally the only information available after decapsulation. Decapsulation removes the information that was added during encapsulation. Using the IPSec ESP tunnel protocol as an example, when a payload packet arrives at a tunnel endpoint, the outer IP header, the ESP header, and the ESP trailer are removed. After successful packet authentication, this encapsulation information is deemed reliable, thereby establishing confidence as to the identity of the sender, as discussed previously. However, after discarding the encapsulation fields, the information in the payload packet itself is all that is available for subsequent security processes, and so the payload data must be verified for accuracy if the security rules (access and routing) of the remote network are to depend on it. This is because, although the tunnel authentication process validates the identity of the sender, it gives no direct assurance as to the reliability or accuracy of the payload data contained in the payload packets.

This means that a potential for "spoofing" (i.e., providing false packet information to subvert restrictions) exists with respect to the information (such as layer 3 addresses, port numbers and protocol numbers) embedded within the tunnel payload. A tunnel may provide authentication and data integrity, but it does not provide protection against false or unreliable information contained within the payload itself. Therefore, unless special processes are put in place to validate the information contained within the payload packets, there is nothing to prevent authenticated tunnel participants from using packet spoofing methods to gain access to resources within the remote network to which they have not been granted valid authorization.

To eliminate potential spoofing problems in this example situation, it would be necessary to analyze packets after they have exited a tunnel, and to determine which resources the author of the packet is allowed to access within the remote network. For example, a user may have permission to connect to a remote network over a VPN tunnel, but may only be allowed to access a limited set of selected services within the remote network. However, the VPN process itself is an "all-or-nothing" process, in the sense that packets are either totally accepted as authentic (and therefore deemed to be trusted), or are rejected in their entirety. Therefore, the additional information required to enforce additional access control restrictions would have to be derived by analyzing the contents of the trusted payload packets themselves.

Some existing VPN devices provide varying degrees of support for post-VPN analysis of packets (for example, in the form of access control lists). These types of post-VPN features provide a limited means for attempting to distinguish between valid and spoofed packets. Packet analysis rules that are sufficiently rigorous may be able to reject illegal or suspicious packets. Under some circumstances it may be possible to securely enforce all required additional access restrictions within the remote network. However, some negative consequences of having to rely on the analysis of payload data are:

the security of the resulting system depends on the adequacy of the analysis of the incoming payload packets;

the process of creating, verifying, testing, and maintaining payload analysis rules can be tedious, slow, error-prone, and expensive; and the tunnel cannot safely be used to transport packets for which analysis mechanisms have not been established.

The last restriction can be rather severe, because it forces a tradeoff between the costs of maintaining access rules, and the value of the various protocols allowed to pass through the tunnel. This tradeoff applies to any and all security processes that depend on information contained in the payload packets, because any such process requires rules that are based on the organization and interpretation of the data contained in the packets.

Routing or access control rules are typically based on various fields of a layer 3 packet header, and sometimes on payload data itself. One example of a routing rule would be a static routing table entry directing all packets outside a specified destination address range to a specific gateway address. An example of an access control list would be a rule that mandates that all traffic on a particular protocol port be rejected unless addressed to a limited range of web server addresses.

The process of selecting the destination of network frames and/or packets has historically been described using terminology that differs depending on the layer of the Open Systems Interconnect (OSI) model to which the frames and/or packets belong. Layer 2 decisions, although sometimes referred to as "layer 2 routing", are more commonly referred to as "switching" decisions, whereas the Layer 3 decision process is most commonly referred to as "routing". Ethernet frames, switch ports, and port-based VLANs all exist at Layer 2 of the OSI model, whereas IP packets correspond to layer 3 of the OSI model. One commonality between switching and routing is that they both correspond to a process of deciding the address of the next hop for a packet or frame, although each restricts itself to using address information at their respective OSI layers.

A limitation of existing network devices and techniques is that, although a tunnel itself may serve as a carrier for layer 3 packets (and may therefore be viewed as existing at layer 2), existing network devices have not made it possible to securely associate tunnel packets with layer 2 destinations, except through the use of a multi-step process that involves using the layer 3 information contained in the payload packet. For example, the process of routing all packets from tunnel A to a VLAN B could be accomplished by restricting the layer 3 addresses of all packets entering and leaving tunnel A, and then associating the same restricted layer 3 addresses to VLAN B (for routing purposes).

SUMMARY OF THE INVENTION

If it were possible for a routing decision to be based on the identity of the authenticated originator of the tunnel from which a payload packet emerged, the need to analyze and restrict the information in tunnel packets would be eliminated. an intervening translation mechanism that creates associations (and therefore dependencies) between the two layers. Accordingly, a need exists for a method and apparatus for providing private network security that overcomes the aforementioned problems associated with existing configuration options.

In accordance with the present invention, routing/switching rules are capable of being based on information in one or more layers (e.g., layers 2 and/or 3), without requiring that the frame or packet destination be specified in the same layer. Thus, the present invention provides valuable options not available with the aforementioned existing devices and techniques.

The apparatus of the present invention comprises authentication logic, decision logic and routing logic. The authentication logic is configured to receive packets sent from a source agent to a tunnel endpoint and to determine whether or not a Security Association (SA) of the packet corresponds to the source agent. The decision logic makes a routing decision for each authenticated packet that is constrained based on the SA of the authenticated packet. If authentication is successful, the routing logic selects a routing destination that is based at least partially, if not solely, on the routing decision made by the routing decision logic.

The method for performing network routing in accordance with the present invention first authenticates received packets sent from a source agent to an endpoint of a tunnel by determining whether a security association of a received packet corresponds to the source agent that sent the packet, the tunnel being configured by said source agent in accordance with a network protocol. A routing decision is then made for an authenticated packet, which is constrained based on the security association of the authenticated packet. A routing destination for a packet is then selected based at least partially on the routing decision. The authenticated packet is then routed to the selected routing destination.

These and other features and advantages of the present invention will become apparent from the following description, drawings and claims.

DETAILED DESCRIPTION OF THE INVENTION

The present invention provides a method and apparatus that preferably are implemented at an endpoint of a tunnel that utilizes the security association (hereinafter referred to as either "security association" or "SA") of a packet received to determine one or more destinations within a private network to which the other party to the security association contract (hereinafter referred to as the "security association partner" or "SA partner") will be allowed to route packets. Therefore, in accordance with the present invention, the destinations to which packets are routed once the endpoint authentication process has been performed are independent of the contents of the decrypted packets.

For purposes of clarity in distinguishing between an outer tunnel packet and an inner payload packet while describing the present invention, the following description will proceed as if it were assumed that the payload is always to be encrypted, although this is not a requirement of the invention, but is an option of various tunnel protocols. The phrase "decrypted packet", as that phrase is used herein, is intended to denote a payload packet that has exited the tunnel and is ready to be treated as a routable network packet in its own right.

It should be noted that the term "routing", as that term is used herein, is intended to denote both transmission of information within a single layer and between multiple layers, rather than the meaning that the term "routing"

normally implies, which is within a single layer. In typical OSI model networks, the selection of a destination queue for a network packet is based on the addressing information at a single layer. For example, a layer 2 device "switches" packets based on layer 2 information (e.g., a NIC address, or a VLAN tag), whereas a layer 3 device "routes" packets based on layer 3 information (e.g., IP addresses). VLANs and NIC addresses are examples of layer 2 addresses. The present invention provides a direct routing technique to either a layer 2 address or a layer 3 device without requiring translation of, or association between, layer addresses.

In accordance with the present invention, tunnel endpoints are legitimate routing destinations, but are not required to be associated with conventional layer 3 addresses, such as IP addresses. Tunnel endpoints may be referenced as either layer 2 concepts of the present invention. In accordance with an example embodiment of the present invention, a tunnel has four virtual layer 2 ports. The inbound SA has a local and a remote port, and the outbound SA also has a local and a remote port. These virtual tunnel ports could participate in remote VLANs by means of VLAN tagging protocols, such as the Institute of Electrical and Electronic Engineers (IEEE) standard 802.1Q protocol, GARP VLAN Registration Protocol (GVRP), and others. One example of a novel benefit provided by this example embodiment is that it provides the ability to directly route all packets at the egress of tunnel A directly to the ingress of tunnel B, thereby connecting two tunnels in one direction. This example embodiment would also allow two tunnels to be connected bi-directionally, thus providing the ability to create a single combined tunnel between the two distant endpoints. Another advantage of the present invention is that it supports the direct unification of two remote VLANs via a VPN tunnel that connects the VLANs without having to coordinate or restrict layer 3 addresses between the untrusted inside of either VLAN and the outside trusted networks that manage the gateways and other sensitive services of the VPN. Another example of a benefit of the present invention is that it provides the ability to specify that all packets from a particular VLAN (e.g., VLAN C) be routed to the ingress of a particular tunnel (e.g., tunnel D).

An example in which the SA would provide only a partial routing constraint would be: specifying that all packets at the egress of tunnel E with source IP addresses within network 10.0.0. X are to be routed to VLAN F, and that all packets with source IP addresses within network 10.0.9. X are specified to be routed to VLAN G. The routing constraint provided by the SA would be partial in this example because an additional constraint is provided by the IP addresses of the routed packets. Together, the SA and the IP addresses would provide a complete routing decision. This example is intended to convey the fact that the present invention is not limited to providing routing decisions based only on tunnel security associations, but that the present invention also supports many other conventional or known routing rules and can be applied in conjunction with them in any combination.

The present invention also allows rules to be written that specify, for example, that all packets from a particular VLAN (e.g., VLAN H) must be routed to the ingress of a particular tunnel (e.g., tunnel J), or that specify the use of other conventional routing constraints based on such things as layer 3 source or destination addresses, protocol port numbers, or based on layer 2 constraints, such as network interface card (NIC) numbers.

Figure 1:
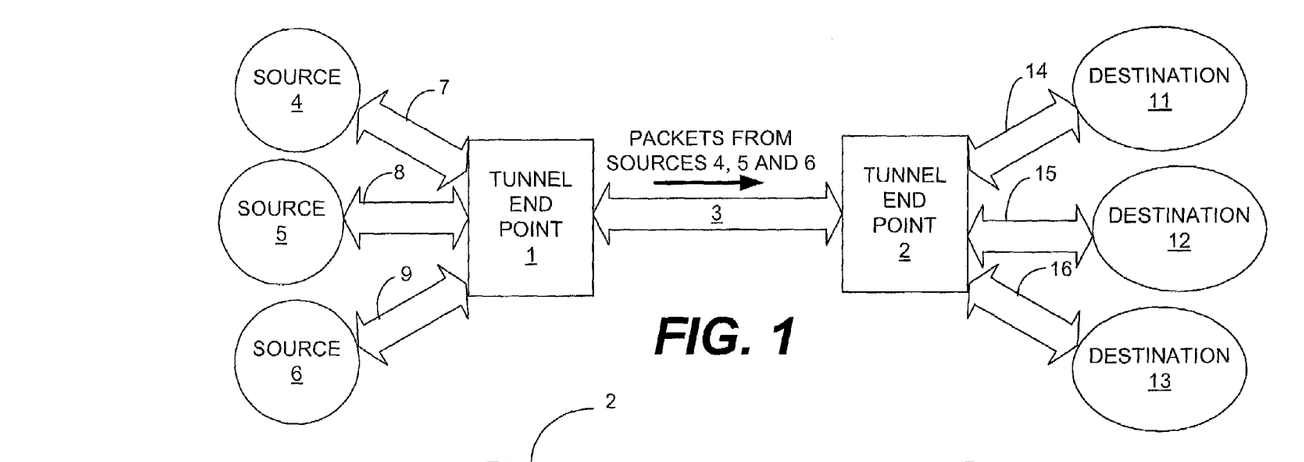
FIG. 1 is a block diagram illustrating an environment in which the method and apparatus of the present invention can be employed.

FIG. 1 is a block diagram illustrating a scenario in which first and second endpoints 1 and 2, respectively, are in communication with each other via tunnels, collectively designated by the numeral 3, which have been set up or configured by sources 4, 5 and 6 in accordance with some VPN security protocol such as, for example, the IPSec protocol. FIG. 1 will be used herein to demonstrate the manner in which an attempt to violate a contract by spoofing is prevented by the present invention.

The first endpoint 1 is in communication with first, second and third sources 4, 5 and 6, respectively, via a private network, which is represented by connections 7, 8 and 9. The sources 4, 5 and 6 will be assumed to be isolated networks for this example, although they could be, for example, host computers, VLANs, etc. The second endpoint 2 is in communication with fourth, fifth and sixth destinations 11, 12 and 13, respectively, via a private network, which is represented by connections 14, 15 and 16. The destinations 11, 12 and 13 will be assumed to be isolated networks for this example, although they could also be, for example, host computers, VLANs, etc.

For the purposes of describing the present invention, it will be assumed that the IPSec protocol is being utilized to configure and maintain the tunnels 3. Accordingly, each IPSec packet will include a destination IP address, an ESP header, and a payload. The payload includes, among other information, an internal destination address and data, both of which may be encrypted. As stated above, if the payload packet is successfully authenticated at the destination endpoint, the decrypted internal destination address is normally used by the endpoint device to determine the destination to which the decrypted packet is to be routed within the private network.

In order to demonstrate the manner in which the present invention prevents a contract from being violated, the following assumptions will be made. It will be assumed that isolated network 4 is authorized by contract to send packets over their tunnel only to isolated network 11. It will be assumed that isolated network 5 is authorized by contract to send packets over their tunnel only to isolated network 12. It will be assumed that isolated network 6 is authorized by contract to send packets over their tunnel only to isolated network 13. It will also be assumed that isolated network 4 violates the contract by sending payload packets that are addressed to isolated network 13. Therefore, the internal destination address contained in the payloads of the packets being sent by isolated network 4 is different from the addresses legally permitted (by the contract) to be sent by isolated network 4.

Figure 2:
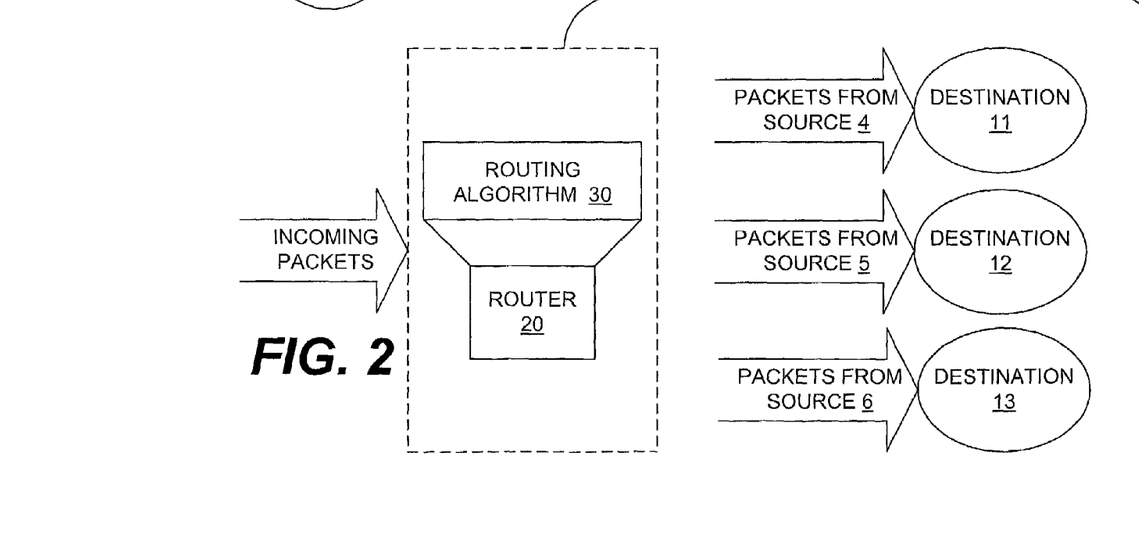
FIG. 2 is a block diagram illustrating the results of routing decisions being constrained based on the security associations (SAs) associated with the sources shown in FIG. 1.

FIG. 2 is a block diagram that will be used to demonstrate the manner in which the present invention ensures that the legal restrictions of the contract are enforced. In FIG. 2, tunnel endpoint 2 is illustrated as comprising a router 20, which is used at the tunnel endpoint 2 for authenticating packets and making routing decisions. Therefore, the router 20 comprises the aforementioned authentication logic, decision logic and routing logic of the present invention. Without the present invention, and, based on the above assumptions, if the router were to make a decision as to where to route a decrypted packet based on the internal destination address included in the packet payload, as dictated by the IPSec protocol, packets from isolated network 4 would end up being routed to isolated network 13, notwithstanding that this is contrary to the security policy, (i.e., all packets from source 4 are required by contract to be sent only to isolated network 11). However, in accordance with the present invention, the router 20 executes a routing algorithm 30 that makes the decision as to where the decrypted packet contents are to be routed based on the security association, rather than based on the decrypted internal address.

Without the present invention, packets received at a tunnel endpoint could be improperly routed based on the contents of the decrypted payload packet (i.e., based on the internal destination address contained in the decrypted payload) or rejected by the use of firewall techniques (e.g., access control lists (ACLs)) and therefore discarded rather than routed. The present invention eliminates the potential that this type of security breach will occur by constraining routing based on the security association. In addition, the present invention enables a routing policy to be implemented that supports layer 3 independence between routing endpoints. For example, the present invention permits all three destination networks 11, 12 and 13 in FIG. 1 to re-use the same layer 3 addresses (i.e., to have overlapping layer 3 addresses). For example, assuming an IP network, each destination network could assume it had exclusive use of the 10.0.0.0/8 network. The present invention would actually permit all six remote networks illustrated in FIG. 1. to pass non-IP protocol (e.g., IPX or Appletalk) packets through IPSec tunnels with the same security and ease with which IP packets would be accommodated.

As stated above, with existing devices and techniques, the security association associated with a packet is not available after the packet has been authenticated. Therefore, with existing devices and techniques, the only way to ensure that the decrypted payload data may be safely used for enforcing routing policy is to employ some type of second validation process (such as an access control list) that analyzes the contents of the decrypted payload and compares them to an appropriate list of access policies for each respective SA partner (i.e., each tunnel). Furthermore, if the access filtering devices assume a particular protocol (e.g., if the language in which the policy rules are written assumes that payload packets are always IP protocol), then the tunnel may not be used to transport any other protocol. The present invention overcomes these disadvantages, as discussed below in more detail with reference to FIGS. 3–4C.

Figure 3:
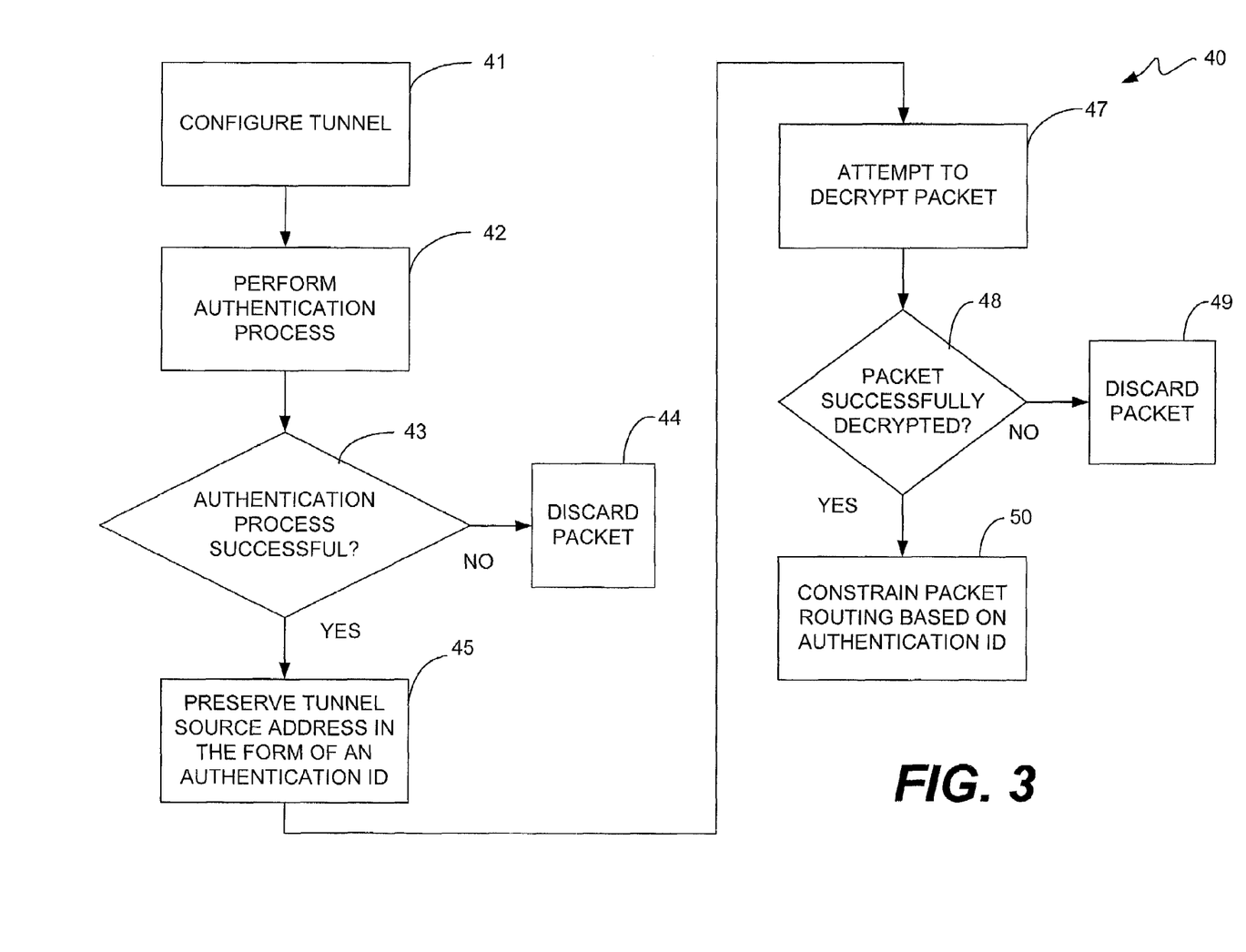
FIG. 3 is a flow chart illustrating the method of the present invention in accordance with one embodiment.

The method 40 of the present invention, in accordance with one embodiment, will now be discussed with reference to the flow chart shown in FIG. 3. In accordance with the present invention, a tunnel is configured using a reliable VPN security protocol, such as the IPSec protocol as indicated by block 41. Once the tunnel has been configured, whenever a packet is received at an endpoint of the tunnel that incorporates the method and apparatus of the present invention, an authentication process is performed, as indicated by block 42, which authenticates the packet, as indicated by block 43. If authentication fails, the packet is discarded, as indicated by block 44. If the packet is authenticated, the security association of the packet is preserved in a form that corresponds to an authentication ID, as indicated by block 45. In the case where the IPSec protocol is utilized, the inbound SA is the security association. The authentication ID may be the security association, or it may be derived from the security association.

If the tunnel is configured to use encryption, then an attempt is made to decrypt the packet, as indicated by blocks 47 and 48. If the packet cannot be successfully decrypted, then it is discarded, as indicated by block 49. If the packet is successfully decrypted, or if the tunnel is not configured to use encryption, then the routing decision for routing the contents of the packet is constrained based on the authentication ID, as indicated by block 50. The manner in which this latter step is accomplished will be discussed below with reference to the embodiments of FIGS. 4A–4C.

In general, the present invention provides the ability to constrain routing decisions based on the authentication ID without regard to packet contents. The manner in which routing can be constrained in accordance with the present invention varies and depends on the environment in which the present invention is employed. For example, the constraint could be a partial restraint on a range of allowed routing destinations, or a full constraint on a complete routing decision.

Figure 4A:
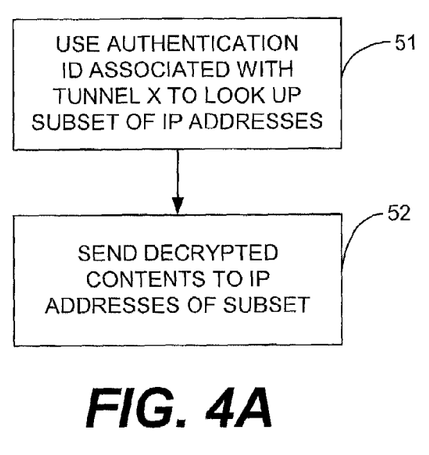
FIGS. 4A–4C are flow charts illustrating examples of various types of constraints that may be placed on routing based on the SAs in accordance with the present invention.

An example of a full constraint on a complete routing decision is illustrated by the flow chart of FIG. 4A. In this case, each IP packet arriving through tunnel X must be directed to destination Y, which is a layer 3 device. In this case, each IP packet arriving through tunnel X is authenticated and, assuming the authentication is successful, a table is used to look up the destination address to which the packets may be routed, as indicated by block 51. The authenticated packets are then routed to the IP address found in the table, as indicated by block 52. In this case, it is not necessary to require the contents of the packets arriving through the tunnel to include layer 3 information because the layer 3 information needed for routing is obtained using the table from the security association. If the table specified that the packet required a routing header to be added (as would typically be the case if the packet were non-EP protocol packet), the appropriate IP header would be added to the packet before sending it along to its routing destination. A similar process would apply if the IP address in the table entry were specified as one or more ranges of IP addresses. The packet would then be multicast to each of the address ranges.

A routing constraint based on a table lookup (as described above) could also be applied in reverse to permit packets to exit through the ingress of an outbound tunnel. In this case, they could also optionally be routed without requiring an examination of the contents of the packet, if the constraint in the table were specified to remove the IP header from the (presumably non-EP) packet before routing it through the tunnel. It should be noted that the automatic addition and removal of EP header information would only be required for non-IP packets that must be routed to an IP gateway. There is no need for an added IP header for routing decisions that select layer 2 destinations, because this type of decision is already independent of the layer 3 protocol of the payload.

Figure 4B:
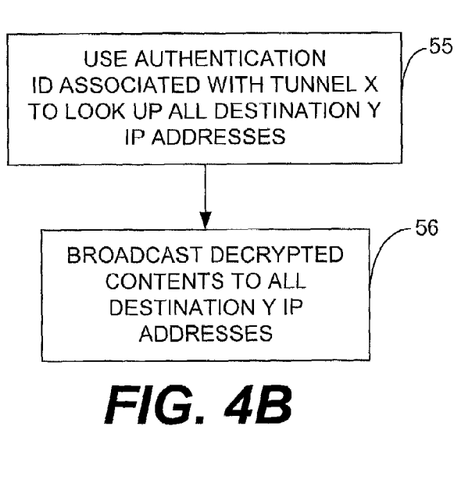

An example of a partial constraint on a complete routing decision is illustrated by the flow chart of FIG. 4B. In this case, each IP packet arriving through tunnel X is to be broadcast to all IP addresses in destination Y, which is a layer 3 device. Therefore, assuming each packet is authenticated, a table is used to look up all of the IP addresses corresponding to destination Y, as indicated by block 55. Each authenticated packet is then broadcast to all destination Y IP addresses found in the table, as indicated by block 56. As with the example discussed above with reference to FIG. 4A, it is not necessary to require the contents of the packets arriving through the tunnel to include layer 3 information because the layer 3 information needed for routing is obtained from the security association rather than from the packet contents. Similarly, packets exiting through the tunnel could preferably be routed in the reverse direction without requiring an examination of the contents of the packet, when the same constraint is specified in the reverse direction.

Figure 4C:
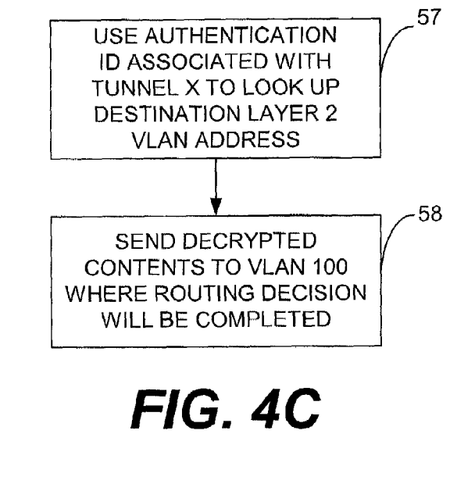

An example of a routing decision that is partially constrained by the security association of the tunnel is illustrated by the flow chart of FIG. 4C. In this case, all packets received from tunnel X and with destination IP addresses within the 10.0.0. X network are required to be routed to VLAN 100. The security association would be one constraint (block 57), and the payload packet destination IP address would be another (block 58). As indicated above, using the security association is a feature of the present invention, whereas using an IP address within the payload packet is a conventional routing technique. Therefore, as stated above, these routing methods can be combined in accordance with the present invention.

It should be noted that in all of the example embodiments discussed above with reference to FIGS. 3–4C, the security association is preserved so that it will not be lost as a result of the decapsulation process. This is contrary to known routing implementations, which decapsulate the packet after authentication, and, in the process, lose the association between the SA and the packet, or that otherwise prevent the SA from being available for purposes of specifying routing rules. As is understood by those skilled in the art, the SA associated with an authenticated packet contains valuable information that is not duplicated in the contents of the packet, and the contents of the packet are potentially subject to spoofing techniques.

It should also be noted that by constraining routing based on the security association, it can be ensured that packets are routed to the proper device (e.g., a VLAN) regardless of the packet contents. This is advantageous in situations where the endpoint equipment is responsible for routing packets to multiple VLANs that may be managed or owned by different entities. In this situation, the possibility of the endpoint equipment improperly routing a packet to the incorrect VLAN is eliminated and the responsibility of ensuring that packets received by a VLAN are internally routed to the proper destination within the VLAN is a responsibility of the VLAN rather than the tunnel endpoint equipment. The tunnel endpoint equipment is thereby made immune to the choice of protocols and the configuration of equipment within or below the VLANs.

These new features greatly simplify the security management process by providing a direct method for preventing untrusted packets from participating in the security control network. Once configurations have been tested and confirmed to support all required restrictions, the need for some types of intrusion detection is also reduced. An additional advantage is that the security gateway providing the tunnel endpoints gains effective bandwidth by not having to apply access control list rules to each tunnel packet.

It should be noted that although the present invention has been described with reference to particular embodiments, the present invention is not limited to the example embodiment discussed herein. For example, although the method and apparatus of the present invention preferably are implemented in the form of software being executed by a security gateway router or layer 3 switch system at the endpoint, these functions may be performed solely in hardware or in a combination of hardware and/or firmware and/or software. Also, although the present invention has been discussed with reference to layers 2 and 3 of the OSI networking model, the present invention can be advantageously used in other networking environments. Those skilled in the art will understand, in view of the discussion provided herein, the manner in which modifications can be made to the embodiments discussed herein that are also within the scope of the present invention.

What is claimed is:

1. An apparatus for performing network routing, the apparatus comprising:

authentication logic configured to receive packets sent from a source agent to an endpoint of a tunnel and to determine whether a security association of a packet received corresponds to said source agent, the tunnel being configured by said source agent in accordance with a network protocol;

decision logic configured to make a routing decision for each authenticated packet at least in part without regard to contents of a payload of the packet, the routing decision being based on the security association of the authenticated packet; and routing logic configured to select a routing destination for each authenticated packet and to route the authenticated packet to the selected routing destination, the routing destination selection being based at least partially on said routing decision.

2. The apparatus of claim 1, wherein the routing destination selection is based solely on said routing decision.

3. The apparatus of claim 1, further comprising:

decapsulation logic configured to decapsulate received packets, wherein when the decapsulation logic decapsulates a packet, the security association of the packet is preserved and contents of a payload of an authenticated packet are routed to the selected routing destination.

4. The apparatus of claim 1, wherein the network protocol is Internet Protocol Security (IPSec) Protocol (IPSEP).

5. The apparatus of claim 1, wherein the network protocol is a public protocol.

6. The apparatus of claim 1, wherein the network protocol is a private protocol.

7. The apparatus of claim 1, wherein said routing decision is a decision to route at least a portion of contents of a payload of an authenticated packet to a layer 3 device, wherein layer 3 corresponds to a particular layer of Open Systems Interconnect (OST) networking model.

8. The apparatus of claim 7, wherein the layer 3 device is a router.

9. The apparatus of claim 1, wherein said routing decision is a decision to route at least a portion of contents of a payload of an authenticated packet to a layer 2 device, wherein layer 2 corresponds to a particular layer of Open Systems Interconnect (OSI) networking model.

10. The apparatus of claim 9, wherein the layer 2 device is a switch.

11. The apparatus of claim 10, wherein the e switch is comprised by a Virtual Local Area Network (VLAN).

12. The apparatus of claim 1, wherein the decision made by the decision logic is a decision whether to route at least a portion of payload contents of an authenticated packet to a layer 2 device or to a layer 3 device, wherein layers 2 and 3 correspond to particular layers of Open Systems Interconnect (OSI) networking model.

13. The apparatus of claim 1, wherein said routing decision is made by said decision logic without any regard to the contents of a payload of the authenticated packet.

14. The apparatus of claim 1, wherein an authentication ID is derived from said security association, and wherein said routing decision is constrained based on said authentication ID.

15. A method for performing network routing, the method comprising:

authenticating received packets sent from a source agent to an endpoint of a tunnel by determining whether a security association of a received packet corresponds to the source agent that sent the packet, the tunnel being configured by said source agent in accordance with a network protocol;

making a routing decision for an authenticated packet at least in part without regard to contents of a payload of the packet, the routing decision being constrained based on the security association of the authenticated packet;

selecting a routing destination for a packet based at least partially on the routing decision; and routing the authenticated packet to the selected routing destination.

16. The method of claim 15, further comprising:
decapsulating the packets, wherein when the packet is decapsulated, contents of a payload of the authenticated packet are decapsulated and the security association of the packet is preserved.

17. The method of claim 15, wherein the network protocol is Internet Protocol Security (IPSec) Protocol (IPSEP).

18. The method of claim 15, wherein said routing decision is a decision to route at least a portion of payload contents of the authenticated packet to a layer 3 device, layer 3 corresponding to a particular layer of an Open Systems Interconnect (OSI) networking model.

19. The method of claim 18, wherein the layer 3 device is a router.

20. The method of claim 15, wherein said routing decision is a decision to route at least a portion of payload contents of an authenticated packet to a layer 2 device, layer 2 corresponding to a particular layer of an Open Systems Interconnect (OSI) networking model.

21. The method of claim 20, wherein the layer 2 device is a switch.

22. The method of claim 21, wherein the switch is comprised by a Virtual Local Area Network (VLAN).

23. The method of claim 15, wherein the routing decision is a decision as to whether to route at least a portion of payload contents of an authenticated packet to a layer 2 device or to a layer 3 device, wherein layers 2 and 3 correspond to particular layers of an Open Systems Interconnect (OSI) networking model.

24. A computer program for performing network routing in accordance with a private network security technique, the computer program being embodied on a computer readable medium, the computer program comprising:

a first code segment, the first code segment authenticating received packets sent from a source agent to a tunnel endpoint to determine whether a security association of a received packet corresponds to the source agent that sent the packet, the tunnel being configured by said source in accordance with a network protocol;

a second code segment, the second code segment making a routing decision for an authenticated packet at least in part without regard to contents of a payload of the packet, the routing decision being constrained based on the security association of the authenticated; and a third code segment, the third code segment selecting a routing destination for the authenticated packet based at least partially on the routing decision made by the second code segment.

25. The computer program of claim 24, further comprising:

a fourth code segment that is executed before the second code segment, the fourth code segment performing a decryption algorithm that attempts to decrypt the authenticated packet prior to the second code segment making a routing decision, wherein when the decryption algorithm is successful at decrypting the authenticated packet, contents of a payload of the authenticated packet are decrypted and the security association of the decrypted packet is preserved for use by the second code segment in making the routing decision.

26. A method for routing a packet, comprising:
receiving a packet at a tunnel endpoint;
authenticating the packet;
preserving a security association of the packet as an authentication ID;
making a routing determination for routing contents of the packet by looking up the authentication ID in a table to determine a destination IP address to which the packet is to be routed.

27. The method of claim 26, wherein the routing determination is made without regard to an internal destination address contained within a payload of the packet.

28. The method of claim 26, wherein the packet is an Internet Protocol Security (IPSec) packet.

29. The method of claim 26, further comprising routing the packet to an IP address found in the table.

30. The method of claim 26, further comprising broadcasting the packet to all IP addresses found in the table that pertain to a given destination.

* * * * *